(12) United States Patent
Lee et al.

(10) Patent No.: US 8,004,745 B2
(45) Date of Patent: Aug. 23, 2011

(54) ELECTRONIC PAPER DISPLAY DEVICE AND MANUFACTURING METHOD OF THE SAME

(75) Inventors: Hwan Soo Lee, Suwon-si (KR); Yong Soo Oh, Seongnam-si (KR); Sang Moon Lee, Seoul (KR); Hye Yeon Cha, Yongin-si (KR); Jeong Bok Kwak, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/654,678

(22) Filed: Dec. 29, 2009

(65) Prior Publication Data

US 2011/0090555 A1    Apr. 21, 2011

(30) Foreign Application Priority Data

Oct. 16, 2009  (KR) .................. 10-2009-0098873

(51) Int. Cl.
*G02B 26/00*  (2006.01)
*G03G 17/04*  (2006.01)
*G09G 3/34*  (2006.01)

(52) U.S. Cl. ............................ 359/296; 430/32; 345/107
(58) Field of Classification Search .................. 359/296; 430/31–32; 345/107; 349/33
See application file for complete search history.

(56) References Cited

U.S. PATENT DOCUMENTS

| 6,069,439 A | * | 5/2000 | Matsuda et al. | 313/461 |
| 6,327,072 B1 | * | 12/2001 | Comiskey et al. | 359/296 |
| 6,862,129 B2 | * | 3/2005 | Matsuda et al. | 359/296 |
| 2004/0257635 A1 | * | 12/2004 | Paolini et al. | 359/296 |
| 2005/0168800 A1 | * | 8/2005 | Hiraoka et al. | 359/296 |

FOREIGN PATENT DOCUMENTS

KR    10-2004-0084818    10/2004
* cited by examiner

*Primary Examiner* — Dawayne A Pinkney

(57) ABSTRACT

The present invention provides an electronic paper display device including: a first electrode; a second electrode facing the first electrode; a barrier layer interposed between the first and second electrodes to define a plurality of cells; and a microcapsule disposed in each cell between the first and second electrodes and maintaining a ratio of minor axis to major axis of 0.9 to 1, and a manufacturing method of the same.

8 Claims, 3 Drawing Sheets

[FIG. 1]
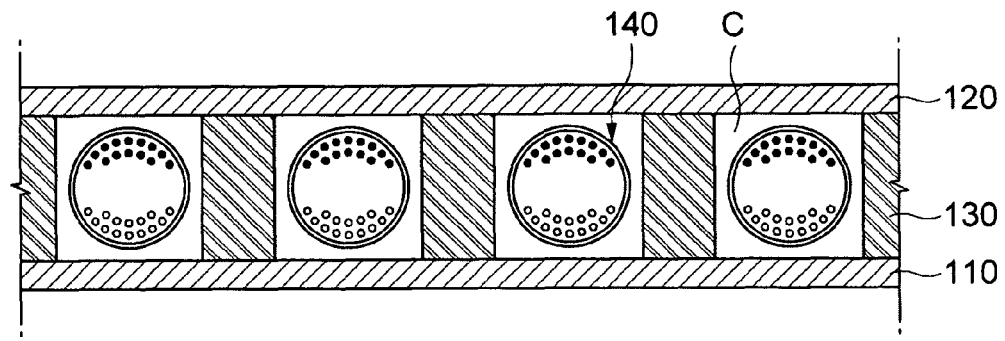
[FIG. 2]
140
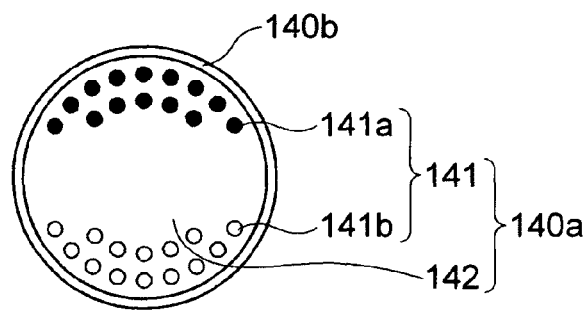
[FIG. 3]
140
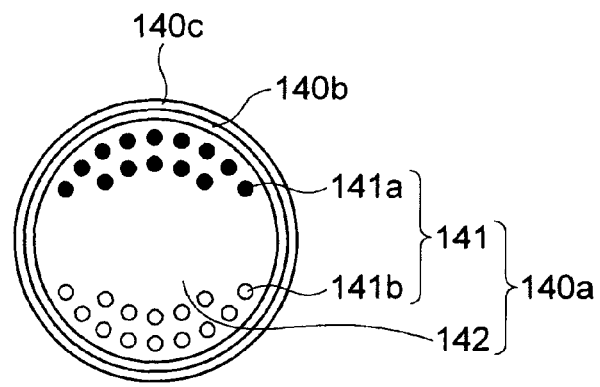

[FIG. 4]
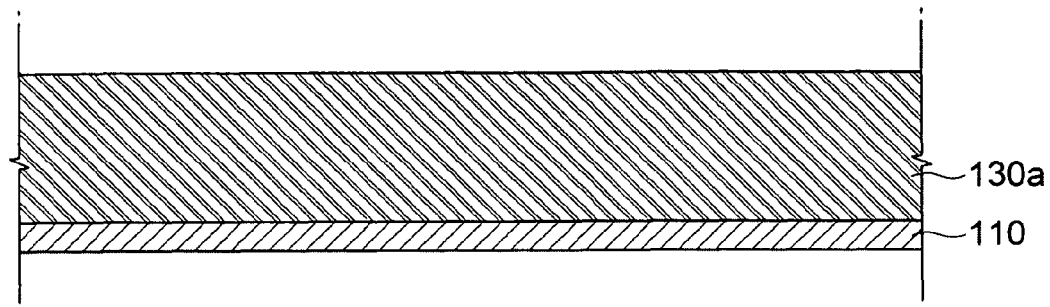
[FIG. 5]
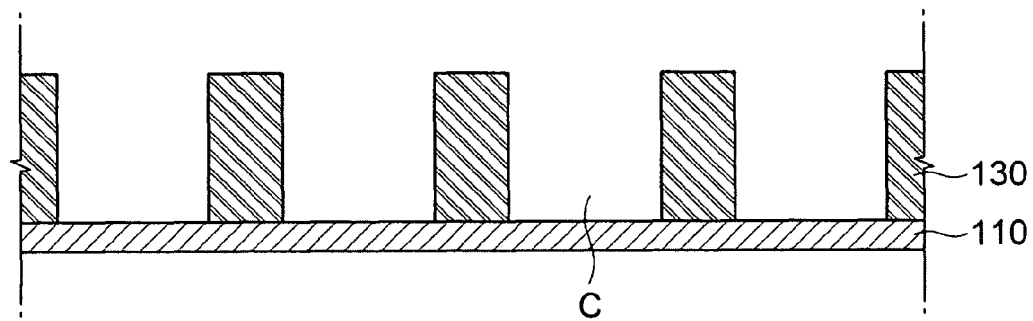
[FIG. 6]
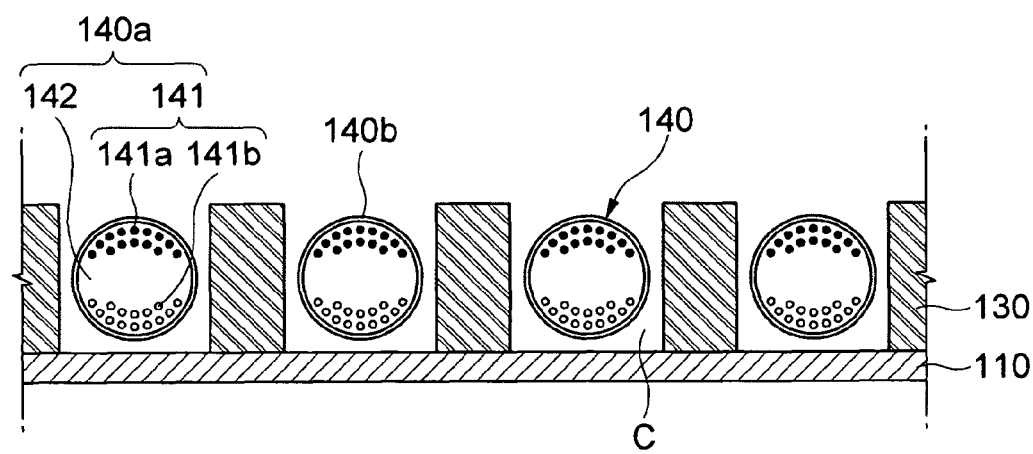

[FIG. 7]
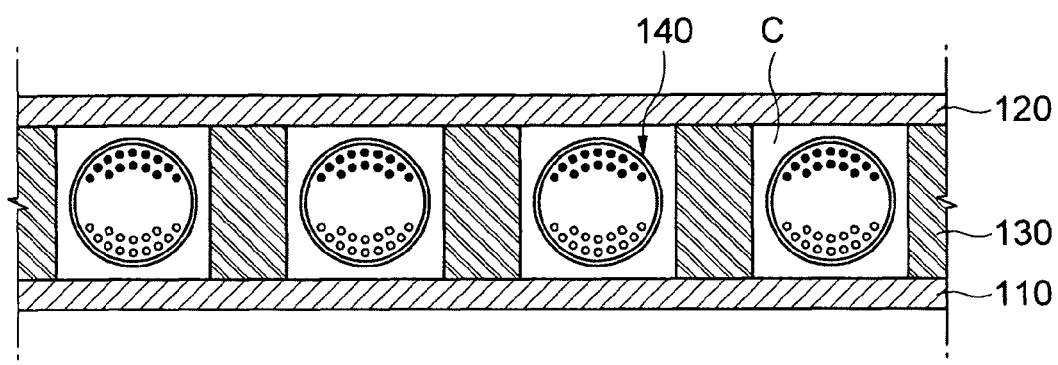

ELECTRONIC PAPER DISPLAY DEVICE AND MANUFACTURING METHOD OF THE SAME

CROSS-REFERENCE TO RELATED APPLICATIONS

This application claims the benefit of Korean Patent Application No. 10-2009-0098873 filed with the Korea Intellectual Property Office on Oct. 16, 2009, the disclosure of which is incorporated herein by reference.

BACKGROUND OF THE INVENTION

1. Field of the Invention

The present invention relates to an electronic paper display device and a manufacturing method of the same, and more particularly, to an electronic paper display device having a microcapsule disposed in a cell defined by a barrier layer and maintaining a ratio of minor axis to major axis of 0.9 to 1, and a manufacturing method of the same.

2. Description of the Related Art

A liquid crystal display (LCD), a plasma display panel (PDP), an organic electro-luminescence (EL) device, and an electronic paper display device have been widely propagated as next generation display devices.

Among them, the electronic paper display device can be flexibly bent, and a production cost thereof is much lower than those of other display devices. Further, since the electronic paper display device does not require background lighting or continuous recharging and can be driven with very low energy, it has very high energy efficiency. Further, since the electronic paper display device is clear, has a wide viewing angle, and has a memory function to maintain displayed characters or images even at the time of instantaneous power cut-off, it is expected that the electronic paper display device will be widely used in a broad field such as foldable screens and electronic wallpapers as well as print media like books and newspapers.

Meanwhile, technical methods, such as an organic EL method, a reflective film reflection type display method, an electrophoresis method, a twist ball method, an electrochromic method, and a mechanical reflection type display method, have been independently developed to implement the electronic paper display device.

Among them, the electronic paper display device using the electrophoresis method includes a first electrode, a second electrode, and microcapsules which are interposed between the first and second electrodes and each of which has a core including electrophoretic particles and a shell surrounding the core. At this time, the microcapsules may be fixed by a binder layer provided between the first and second electrodes.

However, the binder layer may cause voltage drop and parasitic capacitance of the electronic paper display device or greatly affect electrophoretic property of the electrophoretic particles.

Furthermore, since the microcapsules may not be uniformly disposed in the binder layer, and so there may be some regions in which the microcapsules are overlapped with each other or not disposed, there was a problem of deterioration of a contrast ratio of the electronic paper display device.

Conventionally, in order to improve the contrast ratio of the electronic paper display device, the microcapsules have been formed to be flexible and easily deformed. This is because the conventional microcapsules are easily dispersed by self-weight after being filled between the first and second electrodes, finally the microcapsules interposed between the first and second electrodes come into contact with each other, and density between the microcapsules filled between the first and second electrodes can be improved.

However, since the microcapsules can be easily deformed due to flexibility, it was not easy to handle the microcapsules. Further, it was difficult to uniformly dispose the microcapsules between the first and second electrodes due to cohesion between the microcapsules.

SUMMARY OF THE INVENTION

The present invention has been proposed in order to solve the above-described problems, and it is, therefore, an object of the present invention to provide an electronic paper display device having a microcapsule disposed in a cell defined by a barrier layer and maintaining a ratio of minor axis to major axis of 0.9 to 1, and a manufacturing method of the same.

In accordance with an aspect of the present invention to achieve the object, there is provided an electronic paper display device including: a first electrode; a second electrode facing the first electrode; a barrier layer interposed between the first and second electrodes to define a plurality of cells; and a microcapsule disposed in each cell between the first and second electrodes and maintaining a ratio of minor axis to major axis of 0.9 to 1.

Here, the microcapsule includes a core having electrophoretic particles dispersed in a dielectric liquid and a shell surrounding the core. The shell may include UV-curable resin or thermosetting resin.

Further, the microcapsule may include a core having electrophoretic particles dispersed in a dielectric liquid, a shell surrounding the core, and at least one layer of auxiliary shell surrounding the shell. The auxiliary shell may include UV-curable resin or thermosetting resin.

Further, the microcapsule may be disposed as a single layer between the first and second electrodes.

In accordance with another aspect of the present invention to achieve the object, there is provided a manufacturing method of an electronic paper display device including the steps of: forming a barrier layer on a first electrode or a second electrode to define a plurality of cells; providing a microcapsule, which maintains a ratio of minor axis to major axis of 0.9 to 1, on the first electrode or the second electrode having the barrier layer formed thereon; and bonding the first and second electrodes to each other while interposing the microcapsule therebetween.

Here, the microcapsule includes a core having electrophoretic particles dispersed in a dielectric liquid and a shell surrounding the core. The shell may be UV-cured or thermally cured.

Further, the microcapsule may include a core having electrophoretic particles dispersed in a dielectric liquid, a shell surrounding the core, and at least one layer of auxiliary shell surrounding the shell. The auxiliary shell may be UV-cured or thermally cured.

Further, the microcapsule may be disposed as a single layer between the first and second electrodes.

Further, the barrier layer may be formed by using one of a laser method, a lithography method, a sand blast method, and an imprint method.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a cross-sectional view of an electronic paper display device in accordance with a first embodiment of the present invention;

FIG. 2 is a magnified view of a microcapsule shown in FIG. 1;

FIG. 3 is another form of the microcapsule shown in FIG. 1; and

FIGS. 4 to 7 are cross-sectional views for explaining a manufacturing method of an electronic paper display device in accordance with a second embodiment of the present invention.

DETAILED DESCRIPTION OF THE PREFERRED EMBODIMENTS

Hereinafter, preferred embodiments of the present invention will be explained in detail with reference to the drawings. It should be understood that the following embodiments will be provided as examples to allow those skilled in the art to fully understand the spirit of the present invention. Therefore, the present invention is not limited to the following embodiments but may be embodied in other forms. And, in the drawings, sizes and thicknesses of elements may be exaggerated for convenience. Like reference numerals refer to like elements throughout.

FIG. 1 is a cross-sectional view of an electronic paper display device in accordance with a first embodiment of the present invention.

FIG. 2 is a magnified view of a microcapsule shown in FIG. 1

Referring to FIG. 1, the electronic paper display device in accordance with the first embodiment of the present invention includes a first electrode 110, a second electrode 120, a barrier layer 130, and a microcapsule 140.

The first electrode 110 may be formed of a conductive substrate or a conductive film. The first electrode 110 may be a reflective electrode which reflects light.

Here, in case that the first electrode 110 is formed of the conductive substrate, the first electrode 110 can further perform a role of a support layer which supports the electronic paper display device. On the other hand, in case that the first electrode 110 is formed of the conductive film, a first base layer may be further provided under the first electrode 110 to support the electronic paper display device. The first base layer may be a substrate or a film. Further, the first base layer may be made of plastic or glass.

The second electrode 120 may be disposed to face the first electrode 110. Here, the first electrode 110 and the second electrode 120 may be separated from each other in order to interpose the microcapsule 140 therebetween. Here, the second electrode 120 may be formed of a conductive substrate or a conductive film. At this time, in case that the first electrode 110 is the reflective electrode, the second electrode 120 may be a transparent electrode. At this time, the conductive substrate or the conductive film may be made of light transmitting material such as ITO, IZO, and ITZO.

Here, in case that the second substrate 120 is formed of the conductive substrate, the second electrode 120 can further perform a role of a support layer which supports the electronic paper display device. On the other hand, in case that the second electrode 120 is formed of the conductive film, a second base layer may be further provided on the second electrode 120 to support the second electrode 120. The second base layer may be a substrate or a film. Further, the second base layer may be made of plastic or glass.

The barrier layer 130 is interposed between the first electrode 110 and the second electrode 120. The barrier layer 130 defines a plurality of cells C. At this time, the microcapsule 140 is individually disposed in each cell C. That is, even though the microcapsule 140 is formed as a single layer by the barrier layer 130, since there is no region in which the microcapsules 140 are overlapped with each other or not disposed, it is possible to improve a contrast ratio of the electronic paper display device.

Further, since the microcapsules 140 can be uniformly disposed without a separate binder layer, it is possible to prevent unnecessary voltage drop and parasitic capacitance due to a binder.

The barrier layer 130 may be made of insulating material. For example, the barrier layer 130 may be made of poly acrylic resin, polyurethane acrylate (PUA) resin, polydimethylsiloxane (PDMS) resin, epoxy resin, polyimide resin, or phenolic resin.

The microcapsule 140 includes a core 140a having a dielectric liquid 142 and electrophoretic particles 141 dispersed in the dielectric liquid 142 and a shell 140b surrounding the core 140a.

Here, the electrophoretic particle 141 includes first and second electrophoretic particles 141a and 141b which are charged with different charges. At this time, the first and second electrophoretic particles 141a and 141b may display different colors, respectively, for example, black and white. However, in the embodiment of the present invention, the display colors of the first and second electrophoretic particles 141a and 141b are not limited, and so the first and second electrophoretic particles 141a and 141b can display various colors.

Further, the shell 140b may have enough strength to continuously maintain a shape of the microcapsule 140. At this time, the shell 140b may include UV-curable resin or thermosetting resin. For example, the microcapsule 140 may have enough strength to continuously maintain a ratio of minor axis to major axis of 0.9 to 1. Accordingly, since it is possible to easily inject the microcapsule 140 into the cell C due to improved handling of the microcapsule 140, it is possible to improve productivity of the electronic paper display device with the improved contrast ratio.

The microcapsule 140 may have another form to improve the strength thereof.

FIG. 3 is another form of the microcapsule shown in FIG. 1.

As shown in FIG. 3, the microcapsule 140 includes a core 140a having a dielectric liquid 142 and electrophoretic particles 141 dispersed in the dielectric liquid 142 and a shell 140b surrounding the core 140a. In addition, the microcapsule 140 may include at least one or a plurality of layers of auxiliary shells 140c. Here, the auxiliary cell 140c may be made of material having predetermined strength. For example, the auxiliary cell 140c may include UV-curable resin or thermosetting resin.

Accordingly, in the embodiment of the present invention, it is possible to improve a contrast ratio by uniformly disposing the microcapsules in barrier ribs which define cells.

Further, since the microcapsule has predetermined strength, it is possible to easily dispose the microcapsule in the cell defined by the barrier rib due to improved handling of the microcapsule.

FIGS. 4 to 7 are cross-sectional views for explaining a manufacturing process of an electronic paper display device in accordance with a second embodiment of the present invention.

Referring to FIG. 4, in order to form the electronic paper display device, first, a resin layer 130a is formed on a first electrode 110.

The first electrode 110 may be a conductive substrate or a conductive film. The first electrode 110 may be a reflective electrode. At this time, the conductive substrate or the conductive film may be made of metal such as Cu and Ag. Here, in case that the first electrode 110 is formed of the conductive film, a first base layer may be further provided under the first electrode 110.

Further, for example, the resin layer 130a may be made of poly acrylic resin, PUA resin, PDMS resin, epoxy resin, polyimide resin, or phenolic resin. The resin layer 130a may be formed by a general coating method such as a spin coating method, a doctor blade method, a die coating method, a screen printing method, and a spray coating method.

Referring to FIG. 5, after forming the resin layer 130a on the first electrode 110, a barrier layer 130, which defines a plurality of cells C, is formed by using the resin layer 130a.

In order to form the barrier layer 130, first, a stamp having a shape corresponding to the barrier layer 130 is pressed on the resin layer 130a. At this time, the shape of the stamp is transferred to the resin layer 130a. After that, the barrier layer 130 is formed by performing a curing process in a state in which the stamp is pressed. After forming the barrier layer 130, the stamp is separated from the barrier layer 130.

In the embodiment of the present invention, although it is described that the barrier layer 130 is formed by an imprint method using the stamp, it is not limited thereto. For example, the barrier layer 130 may be formed by one of a laser method, a lithography method, and a sand blast method.

Referring to FIG. 6, after forming the barrier layer 130 on the first electrode 110, microcapsules 140 are injected into the plurality of cells C defined by the barrier layer 130, respectively. The microcapsule 140 may be injected by using a mask. That is, the mask, which has an opening corresponding to the cell C, is provided on the barrier layer 130. After that, the microcapsule 140 is provided on the mask. Then, the microcapsule 140 on the mask is injected into each cell C through the opening of the mask by a squeeze which horizontally reciprocates on the mask.

Here, the microcapsule 140 includes a core 140a having a dielectric liquid 142 and electrophoretic particles 141 dispersed in the dielectric liquid 142 and a shell 140b surrounding the core 140a. At this time, the electrophoretic particle 141 includes first and second electrophoretic particles 141a and 141b which are charged with different charges. At this time, the first and second electrophoretic particles 141a and 141b may display different colors, respectively, for example, black and white. However, in the embodiment of the present invention, the display colors of the first and second electrophoretic particles 141a and 141b are not limited, and so the first and second electrophoretic particles 141a and 141b can display various colors.

Further, the shell 140b may have enough strength to continuously maintain a shape of the microcapsule 140. At this time, the shell 140b may include UV-curable resin or thermosetting resin. For example, the microcapsule 140 may have enough strength to continuously maintain a ratio of minor axis to major axis of 0.9 to 1. Accordingly, since it is possible to easily inject the microcapsule 140 into the cell C due to improved handling of the microcapsule 140, it is possible to improve productivity of the electronic paper display device with an improved contrast ratio.

Since the conventional microcapsule was easily deformed due to its flexibility in a process of being injected into the cell C defined by a predetermined region, that is, the barrier layer 130, it was difficult to inject the microcapsule into the cell C. Further, since the conventional microcapsules were cohered to each other before being injected into the cell C, it was more difficult to inject the microcapsule into the cell C. Further, since the conventional microcapsule was irregularly deformed in a display region after forming the electronic paper display device, it was impossible to provide uniform image quality to a user. That is, the conventional microcapsule was deformed enough to have a ratio of minor axis to major axis of 2 after forming the electronic paper display device.

In order to improve this problem, since the shell 140b includes curable resin such as UV-curable resin or thermosetting resin and undergoes a curing process in a process of forming the microcapsule 140, it is possible to increase strength of the cell C. With this, the microcapsule 140 can constantly maintain its shape after forming the electronic paper display device as well as in a sieving process or a drying process. That is, it is possible to continuously maintain the ratio of minor axis to major axis of the microcapsule 140 of 0.9 to 1.

Since the microcapsule 140 always maintains a constant shape, it is possible to easily dispose the microcapsule 140 in the cell C defined by the barrier layer 130. Further, since the microcapsule 140 can constantly maintain its shape even after completion of the electronic paper display device, it is possible to provide a user with uniform image quality in the entire display region.

In the embodiment of the present invention, although it is described that the microcapsule has the shell of a single layer, it is not limited thereto. For example, the microcapsule may include at least one or a plurality of layers of auxiliary shells which surround the shell. At this time, the shell has flexibility, and the auxiliary shell has predetermined strength. For example, the shell may be made of gelatin, and the auxiliary shell may be made of UV-curable resin or thermosetting resin.

A manufacturing method of the microcapsule in accordance with the present invention will be described in detail later.

Referring to FIG. 7, a second electrode 120 is bonded on the barrier layer 130 into which the microcapsule 140 is injected.

Here, the second electrode 120 may be a conductive substrate or a conductive film. The second electrode 120 may be a transparent electrode. At this time, the conductive substrate or the conductive film may be formed of transparent conductive material such as ITO, IZO, and ITZO. Here, in case that the second electrode 120 is the conductive film, a second base layer may be further provided on the second electrode 120.

Although it is not shown in the drawing, the first and second electrodes 110 and 120 are bonded to each other by a transparent adhesive member coated on the barrier layer 130, for example, silicon resin.

Hereinafter, the manufacturing method of the microcapsule in accordance with the embodiment of the present invention will be described in more detail with reference to an experimental example. Here, the experimental example of the present invention may be modified into various forms, and the scope of the present invention should not be interpreted to be limited to the following experimental example.

Experimental Example

A Manufacturing Method of a Microcapsule

In order to form a microcapsule having predetermined strength, first, a particle dispersion system, which includes electrophoretic particles, that is, first and second electrophoretic particles charged with different charges, a dispersant, and a charge control agent, is formed. Here, the first electrophoretic particle may be, for example, carbon black. The second electrophoretic particle may be, for example, $TiO_2$. The dispersant may be, for example, poly vinyl pyrrolidone (PVP). The charge control agent may be, for example, a hydrocarbon insulating liquid or paraffin oil. Further, in order to form the particle dispersion system, 10 g of the electrophoretic particles, 2 g of the dispersant, and 2 g of the charge control agent are mixed with 10 ml of the hydrocarbon insulating liquid.

An electrophoretic particles dispersed liquid is formed by performing a dispersion process through an ultrasonic dispersion machine after further adding 100 ml of the hydrocarbon insulating liquid to the particle dispersion system. At this time, less than 10 vol % of the electrophoretic particles are included in the entire electrophoretic particles dispersed liquid.

Meanwhile, a reaction medium is formed by mixing 22 g of curable resin with distilled water of a predetermined temperature, for example, 40° C., in a reactor. The curable resin may be UV-curable resin or thermosetting resin. Here, the UV-curable resin may be, for example, acrylic resin such as ethoxylated trimethylolpropane triacrylate (ETPTA). At this time, the reaction medium may further include a photoinitiator such as 2-hydroxy-2-methyl-1-phenyl-1-propanone (HMPP).

Here, the thermosetting resin may be, for example, epoxy resin, urea resin, or melamine resin. At this time, the reaction medium may further include formaldehyde.

After that, 60 ml of the electrophoretic particles dispersed liquid is slowly injected while stirring the reaction medium of a predetermined temperature, for example, 40° C. At this time, a stirring speed may be adjusted according to a drop size.

A stirring process is performed for a predetermined time, for example, 30 minutes, after completing the injection of the electrophoretic particles dispersed liquid.

After that, the stirring process is performed for 30 minutes after slowly adding 600 g of distilled water of 40° C. to the reactor having the electrophoretic particles dispersed liquid and the reaction medium.

Then, after an acacia solution, which is formed by mixing distilled water of 40° C. with 16 g of acacia, is slowly injected, pH is adjusted to 4.9 by adding 10% of an acetic acid solution. This pH adjustment is to prevent the electrophoretic particles dispersed liquid and the acacia solution from being mixed with each other.

Here, in case that the shell is made of the UV-curable resin, it is possible to cure the shell by UV irradiation. On the other hand, in case that the shell is made of the thermosetting resin, it is possible to cure the shell by heating the shell at a predetermined temperature, for example, higher than 80° C.

After that, after adjusting pH, a stirring state is maintained for a predetermined time, for example, 40 minutes while maintaining a temperature inside the reactor at 40° C. After, 8.35 g of a crosslinking agent is added after slowly cooling the temperature inside the reactor to 8° C. while maintaining the stirring state. The crosslinking agent may be, for example, glutaradehyde.

Then, after leaving the temperature inside the reactor to rise to a room temperature, a microcapsule dispersed solution is manufactured. After that, microcapsule particles are formed through a drying process of the microcapsule dispersed solution. After that, the microcapsule particles having a predetermined particle size can be separated by a sieving process. Here, a thickness of a shell of the microcapsule is less than 1 μm. This is to maintain transparency of the microcapsule.

At this time, the microcapsule can constantly maintain its shape in a drying process and a sieving process due to hardness increase of the shell.

Therefore, as the embodiment of the present invention, by using the microcapsule having enough strength to maintain a ratio of minor axis to major axis of 0.9 to 1, since it is possible to easily dispose the microcapsule in a cell defined by a barrier layer, it is possible to easily perform a manufacturing process of an electronic paper display device.

In accordance with the electronic paper display device of the present invention, it is possible to improve the contrast ratio by uniformly disposing the microcapsules in the barrier ribs which define the cells.

Further, since the microcapsule has enough strength to maintain the ratio of minor axis to major axis of 0.9 to 1, it is possible to easily dispose the microcapsule in the cell defined by the barrier rib.

What is claimed is:

1. An electronic paper display device comprising:
   a first electrode;
   a second electrode facing the first electrode;
   a barrier layer interposed between the first and second electrodes to define a plurality of cells; and
   a microcapsule disposed in each cell between the first and second electrodes one by one,
   wherein each of the microcapsules has a spherical or elliptical spherical shape and maintains a ratio of minor axis to major axis of 0.9 to 1, and
   each of the microcapsules includes a core having electrophoretic particles dispersed in a dielectric liquid and a shell surrounding the core.

2. The electronic paper display device according to claim 1, wherein the shell of the microcapsule includes UV-curable resin or thermosetting resin.

3. The electronic paper display device according to claim 1, wherein the microcapsule includes a core having electrophoretic particles dispersed in a dielectric liquid, a shell surrounding the core, and at least one layer of auxiliary shell surrounding the shell, wherein the auxiliary shell includes UV-curable resin or thermosetting resin.

4. The electronic paper display device according to claim 1, wherein the microcapsule is disposed as a single layer between the first and second electrodes.

5. A manufacturing method of an electronic paper display device comprising:
   forming a barrier layer on a first electrode or a second electrode to define a plurality of cells;
   providing a microcapsule, which maintains a ratio of minor axis to major axis of 0.9 to 1, on the first electrode or the second electrode having the barrier layer formed thereon; and
   bonding the first and second electrodes to each other while interposing the microcapsule, wherein the microcapsule therebetween, includes a core having electrophoretic particles dispersed in a dielectric liquid and a shell surrounding the core, wherein the shell is UV-cured or thermally cured.

6. The method according to claim 5, wherein the microcapsule includes a core having electrophoretic particles dispersed in a dielectric liquid, a shell surrounding the core, and at least one layer of auxiliary shell surrounding the shell, wherein the auxiliary shell is UV-cured or thermally cured.

7. The method according to claim 5, wherein the microcapsule is disposed as a single layer between the first and second electrodes.

8. The method according to claim 5, wherein the barrier layer is formed by using one of a laser method, a lithography method, a sand blast method, and an imprint method.

* * * * *

UNITED STATES PATENT AND TRADEMARK OFFICE
CERTIFICATE OF CORRECTION

PATENT NO. : 8,004,745 B2  
APPLICATION NO. : 12/654678  
DATED : August 23, 2011  
INVENTOR(S) : Hwan Soo Lee et al.

It is certified that error appears in the above-identified patent and that said Letters Patent is hereby corrected as shown below:

Column 8, Line 50-51, in claim 5, delete "microcapsule, wherein the microcapsule therebetween," and insert -- microcapsule therebetween, wherein the microcapsule --, therefor.

Signed and Sealed this  
Seventh Day of February, 2012

David J. Kappos  
*Director of the United States Patent and Trademark Office*